(12) United States Patent
Frohnhaus et al.

(10) Patent No.: US 6,220,669 B1
(45) Date of Patent: Apr. 24, 2001

(54) SEAT FRAME OF A VEHICLE SEAT WITH A SEAT SUPPORT HAVING TWO SIDE PARTS AND ONE REAR TIE-BAR

(76) Inventors: Ernst-Reiner Frohnhaus, Nettelbeckstrasse 4, D-42653; Burckhard Becker, Obenkatternberg 25, D-42655 both of Solingen; Wilfried Beneker, Dierath 1, D-42799 Leichlingen, all of (DE)

( * ) Notice: Subject to any disclaimer, the term of this patent is extended or adjusted under 35 U.S.C. 154(b) by 0 days.

(21) Appl. No.: 09/372,264

(22) Filed: Aug. 11, 1999

(30) Foreign Application Priority Data

Aug. 12, 1998 (DE) .......................................... 298 14 444 U

(51) Int. Cl.<sup>7</sup> ...................................................... A47C 7/00
(52) U.S. Cl. .................................. 297/452.18; 297/440.14
(58) Field of Search ............................ 297/440.1, 452.18, 297/338, 337, 339, 325, 253, 440.14

(56) References Cited

U.S. PATENT DOCUMENTS

| | | | |
|---|---|---|---|
| 4,673,215 | * | 6/1987 | Yokoyama . |
| 4,695,097 | * | 9/1987 | Muraishi . |
| 4,850,644 | * | 7/1989 | Kazaoka et al. . |
| 5,284,381 | * | 2/1994 | Aoki et al. . |
| 5,518,298 | * | 5/1996 | LaPointe et al. . |
| 5,775,661 | * | 7/1998 | Matsumoto et al. . |
| 5,941,601 | * | 8/1999 | Scott et al. . |

* cited by examiner

*Primary Examiner*—Milton Nelson, Jr.
(74) *Attorney, Agent, or Firm*—K. S. Cornaby

(57) ABSTRACT

A seat frame of a vehicle seat includes a seat support having two side parts (20,22) and one rear tie-bar (24). The tie bar is detachably connected to the two side parts (20, 22). At least two different tie-bars (24, 25) are provided that may be used optionally one of the tie-bars (25) being conventional and the other tie bar provided with bars for a toddler seat, more particularly with a so-called Isofix connection.

8 Claims, 2 Drawing Sheets

Figure 1:
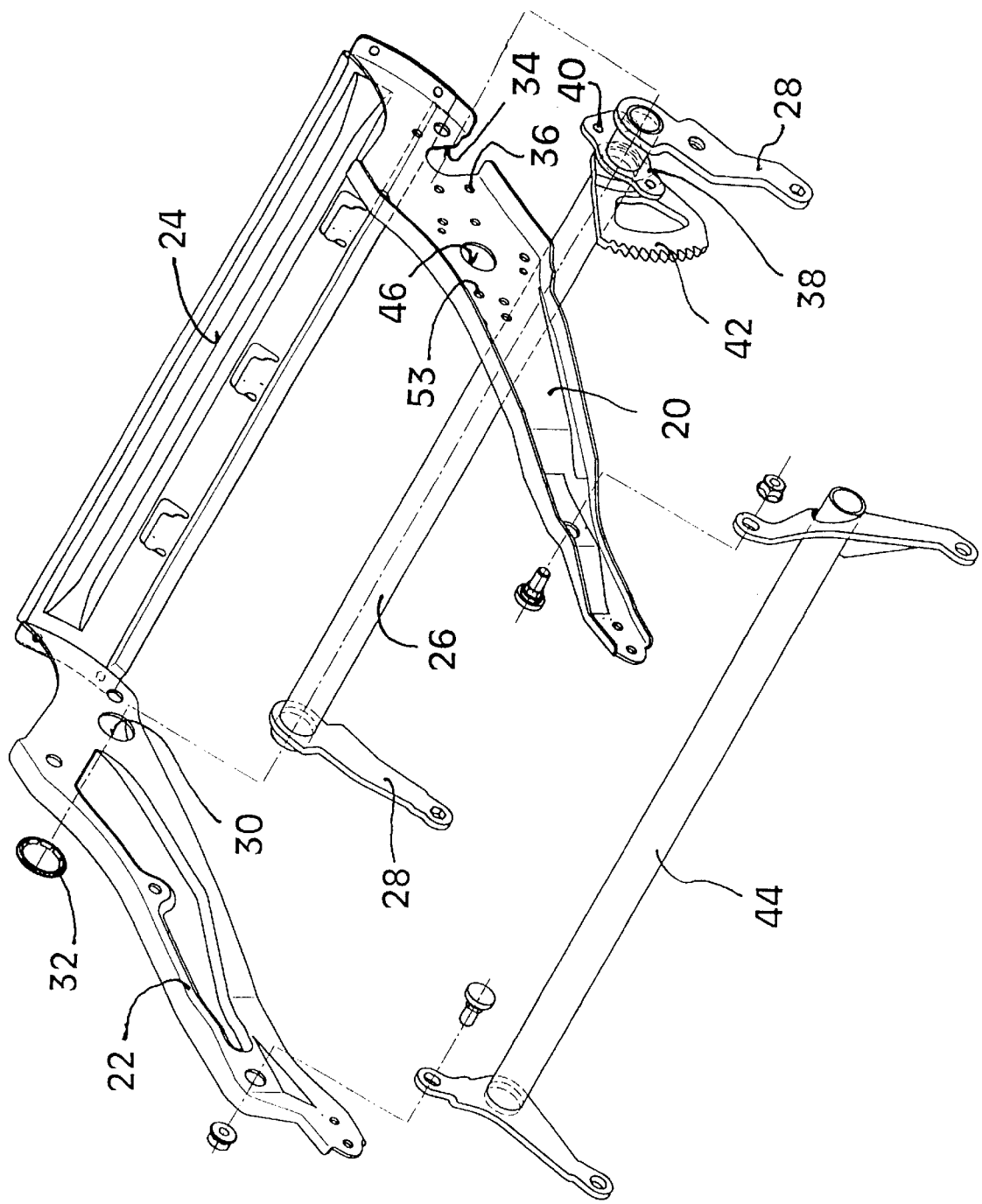

SEAT FRAME OF A VEHICLE SEAT WITH A SEAT SUPPORT HAVING TWO SIDE PARTS AND ONE REAR TIE-BAR

The invention relates to a seat frame of a vehicle seat with a seat support having two side parts and one rear tie-bar.

According to the present state of the art, seat frames are made in weldment. That means that each of the two side parts is welded with the rear tie-bar. A front tie-bar is often correspondingly welded too. The weld joints can be made by spot welding for example. This generally ensures a stable construction that meets the practical requirements.

A disadvantage of such a weldment for the seat frame of the type mentioned above is that the seat frame cannot be modified subsequently. If, for example, a tie-bar has to be provided with fastening means for a toddler seat, e.g. a shell in which a baby may rest, works have to be done on the tie-bar where borings have for example to be provided. Yet this does not result in an adequate fixation. Location devices for standardized toddler seats in particular and here more specifically the so-called Isofix-bars can hardly be retrofitted.

That is where the invention comes to bear. Its object is to develop a seat frame of a vehicle seat so that a tie-bar may subsequently be exchanged and replaced by a tie-bar with holding means for a toddler seat, more particularly with so-called Isofix-bars.

On the ground of a seat frame of the type mentioned above, the solution of this object is that the tie-bar is detachably connected to the two side parts and that at least two different tie-bars are provided that may be used according to choice, namely a standard tie-bar and a tie-bar provided with bars for a toddler seat, more particularly with a so-called Isofix-connection.

According to the invention, the seat frame is no longer designed, at least in the area of the connection between the two side parts and the tie-bar, as a weldment. Here, the two side parts are detachably connected to the rear tie-bar. Therefor, borings are for example provided in the rear area of the side part that are corresponding to borings in the rear tie-bar. Screws are stuck through the borings. Thus, the tie-bar may also be exchanged subsequently and may be replaced by a tie-bar with Isofix-bars for example. Working the old tie-bar or removing a weld joint is thereby not necessary.

The fact that the seat frame is essentially designed in modular system has still further advantages. It is indeed possible to mount at least one transverse shaft between the two side parts without the help of particular mounting aids as they are usually required with a weldment.

Therefor, the present invention suggests providing at least one side part with a location indentation that is preferably open towards the bottom and that receives freely the transverse shaft, providing the side part, additionally to the location indentation, with first fastening means and having the transverse shaft encompassed with a bearing part that assumes the bearing of the transverse shaft, bridges over the location indentation and is provided with second fastening means corresponding to the first fastening means. The transverse shaft may thus be mounted subsequently when the tie-bar is already connected with the two side parts.

Before mounting the transverse shaft to the side walls it may be connected with two adjusting arms and one driving part. A ready-made transverse shaft with accessories may be provided this way and may be mounted only later.

In a preferred embodiment, at least one adjusting arm is located on the outer side of the corresponding side part.

Another advantage is that one bearing part is arranged between one adjusting arm and one driving part.

Further advantages and characteristics of the invention will become clear in the remaining claims and in the following description of an embodiment that is not limiting the scope of the invention. Said embodiment is explained in more detail with reference to the drawing.

Figure 2:
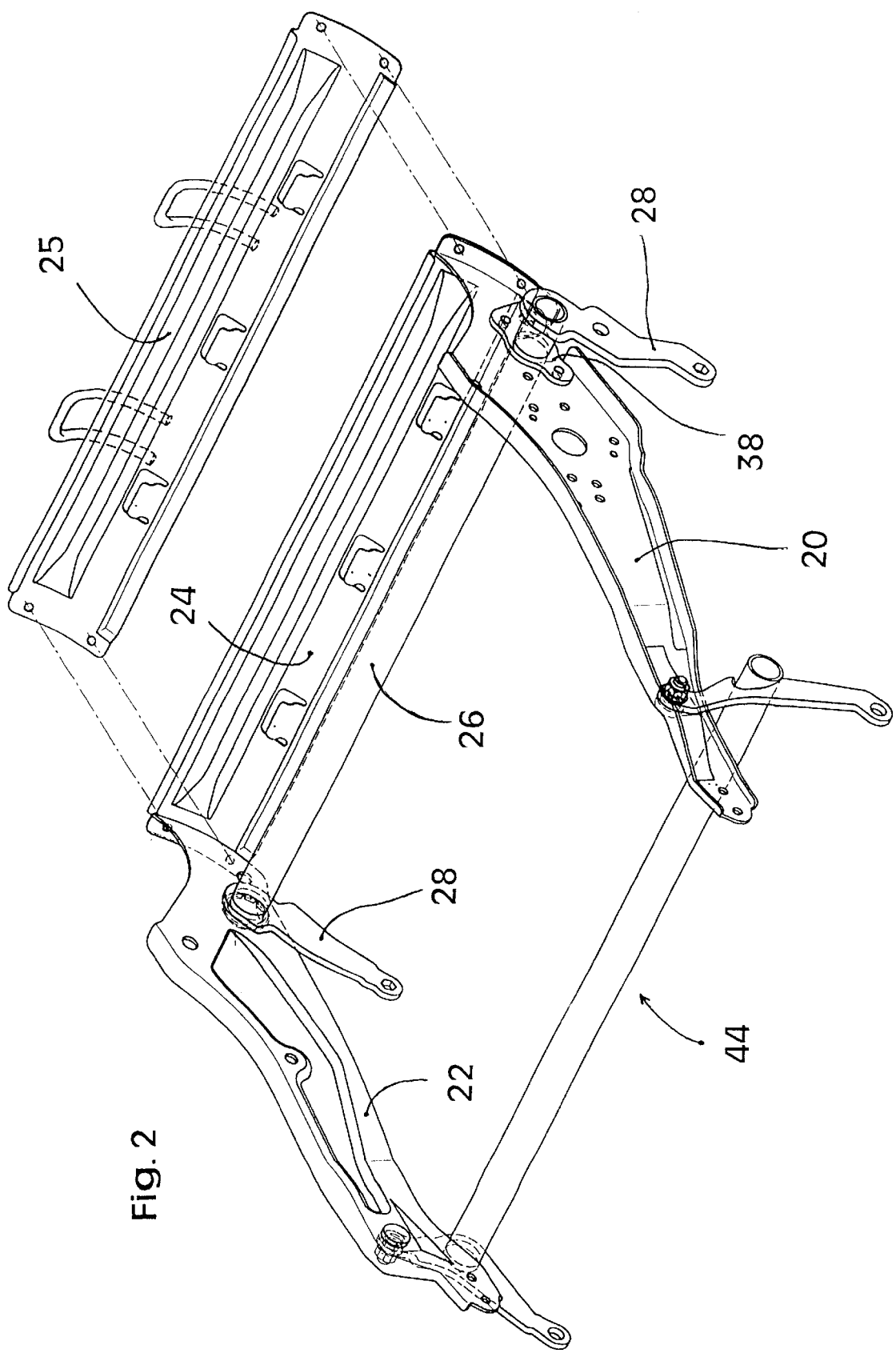

FIG. 1 shows an exploded view of a seat support for a seat frame in an assembly drawing and FIG. 2 shows a representation of the seat support similar to FIG. 1, yet this time not in an assembly drawing but already assembled. The possibility of exchanging the tie-bars is illustrated.

As may be seen in FIGS. 1 and 2 the seat support has a left side part 20, a right side part 22 and a rear tie-bar 24. The terms left and right as well as front and back are always used in relation to a passenger sitting on the seat support.

The seat support also has a rear transverse shaft 26 on which a left and a right adjusting arm 28 are fastened, by welding for example. As may be seen in FIG. 1, the transverse shaft 26 is freely projecting beyond the right adjusting arm 28 so that this free end area may be inserted into a bearing hole 30 of the right side part 22. The securing ring 32 assumes the fixation.

The left side part 20 has a location indentation "or location recess" 34 that is open towards the bottom. To the left and the right of the location indentation holes are provided that are called first fastening means 36. The transverse shaft 36 is encompassed by a bearing part 38, which on one hand assumes the bearing of the transverse shaft 36 and which, on the other hand, is provided with second fastening means 40 also designed as holes. The bearing part 38 is designed so as to overbridge the location indentation 34 and to provide, after having been fastened on the corresponding left side part 20, the (actually lacking) bearing hole for the left area of the transverse shaft 26. In the embodiment shown the bearing part 38 is located, after assembly, on the inner side of the left side part 20, that is between the two side parts 20, 22. The left adjusting arm 28 is located on the outer side of the left side part 20.

Further inwards, on the transverse shaft 26, that is from the bearing part 38 towards the right side part 22, a driving part 42 is linked with the transverse shaft 26. In the concrete realization, the driving part is provided with a toothed quadrant cooperating with a pinion. This will be discussed in detail in the description of FIG. 3.

The description clearly states that the transverse shaft 26, together with its two adjusting arms 28, the bearing part 38 and the driving part 42, may be completely prefabricated as a modular unit that may be inserted later into the prefabricated unit consisting of the two side parts 20, 22 and the rear tie-bar 24. This is shown in FIG. 1 by the upper dot-dash assembly line.

As may be seen in the FIGS. 1 and 2 the rear tie-bar 24 is linked with the two side parts 20, 22 on four points of junction. These points of junction can be unfastened. They may be screw connections for example. They also may be achieved by removable rivets. The junction of the bearing part 38 with the border area of the location indentation 34 may also be achieved by means of the fastening means 36, 40 by welding, rivetting, screwing or the like.

As may be seen in FIG. 2, two different tie-bars 24, 25 may be used. The tie-bar 24 shown mounted is a standard tie-bar. It has, according to the state of the art, holding devices that are receiving seat springs running forward. They are not shown in the drawing. By unfastening the four points of junction correspondingly designed, the tie-bar 24 may be replaced by a tie-bar 25 provided with bars for an Isofix-fastening. This is shown by the four parallel, dot-dash assembly lines. Except the two Isofix-bars, the tie-bar 25 does not differ from the tie-bar 24.

FIG. 1 also shows a front swivel bridge 44. It consists of a transverse tube and of two swivelling props provided each on its upper and on its lower end with a bearing hole and firmly connected to each other in their central area by the transverse tube. This unit too may be preassembled and inserted subsequently into the described arrangement. This is illustrated by the two lower dot-dash assembly lines. Connection means designed here as screws and nuts are located at each end of the two assembly lines.

In the front end area of the two side parts 20, 22 two holes are provided. A front tie-bar (not shown) may be arranged here.

As may be seen in FIGS. 1 and 2, the two side parts 20, 22 are essentially identical but mirror-inverted. They are only different with regard to the bearing hole 30 and the location indentation 34 respectively. A hole is provided in the side part 20 in the vicinity of the location indentation 34. This hole is designed as a bearing 46. Several fastening holes are provided around this bearing 46. An electromotor 48 may be flange-mounted in the area around the bearing 46. It has the following peculiarity: its transmission case is open in its area facing the side part 20, which means that the transmission case is lacking one case wall. The side part 20 is assuming the function of the lacking case wall of the transmission case in the area around the bearing 46. Weight is thus spared, the output shaft of the electromotor 48 is accurately borne in the side part 20 and the allocation to the driving part 42 is favourable.

Instead of a bearing, a correspondingly enlarged bearing part 38 may be inserted directly into the left side part 20, said bearing part assuming at the same time the bearing of the output shaft of the electromotor 48 and the closure of the transmission case.

What is claimed is:

1. Seat frame of a vehicle seat with a seat support, said seat support comprising two side parts and a rear tie-bar, each of said two side parts having a rear end portion, said rear tie-bar having a left and a right end area, said left end area being detachably fixed to said rear end portion of one of said two side parts and said right end area being detachably fixed to said rear end portion of the other of said two side parts, two different rear tie-bars being provided, one of which is provided with bars for fixation of a toddler seat for children and the other of which is not.

2. Seat frame according to claim 1, wherein the one of said two side parts has a location recess said location recess has a bottom margin, and said location recess is open towards said bottom margin.

3. Seat frame of a vehicle seat with a seat support, said seat support comprising two side parts and a rear tie-bar, each of said two side parts having a rear end portion, said rear tie-bar having a left and a right end area, said left end area being detachably fixed to said rear end portion of one of said two side parts and said right end area being detachably fixed to said rear end portion of the other of said two side parts, a transverse shaft being provided between said two side parts, said transverse shaft transmitting an adjusting movement from one of said two side parts to the other of said two side parts, said two side parts each having a margin, one of said two side parts having a location recess, said location recess being open towards said margin, said location recess open towards said margin freely receiving said transverse shaft, said one of said two side parts having said location recess being equipped with a first fastening means, said first fastening means being located next to said location recess, said transverse shaft being encompassed by a bearing part bearing said transverse shaft, said bearing part being designed to overlap said location recess, said bearing part being provided with a second fastening means, said first fastening means and said second fastening means cooperating to fix said bearing part to said one of said two side parts having said location recess.

4. Seat frame according to claim 3, wherein both of said two side parts are equipped with a location recess.

5. Seat frame according to claim 3, wherein the other of said two side parts has a bearing hole for receiving and bearing said transverse shaft, said transverse shaft is provided with a bearing area corresponding to said bearing hole, said transverse shaft has a free end in the vicinity of said bearing area.

6. Seat frame according to claim 2, wherein two adjusting arms and a driving part are provided for adjusting a rotational position of said transverse shaft, and wherein before mounting said bearing part onto said one of said two side parts having said location recess said transverse shaft is connected with said two adjusting arms and said driving part.

7. Seat frame according to claim 6, wherein said bearing part is arranged between one of said two adjusting arms and said driving part.

8. Seat frame according to claim 6, wherein one of said two adjusting arms, which is situated next to said location recess, is located on an outer side of the side part providing said location recess, said outer side facing away from said other side part.

\* \* \* \* \*